(12) United States Patent
Yang et al.

(10) Patent No.: US 6,341,672 B1
(45) Date of Patent: Jan. 29, 2002

(54) BRAKING DEVICE FOR A STROLLER

(75) Inventors: Cheng-Fan Yang, Tainan Hsien; Ya-Wen Hsiu, Kaohsiung, both of (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 09/518,531

(22) Filed: Mar. 4, 2000

(51) Int. Cl.[7] .................................................. B62B 9/08
(52) U.S. Cl. ........................ 188/20; 280/47.38; 280/650
(58) Field of Search ............................. 188/19, 20, 2 F, 188/69; 280/47.34, 47.38, 642, 647, 650

(56) References Cited

U.S. PATENT DOCUMENTS 4,527,665 A * 7/1985 Shamie ........................ 188/20
5,460,399 A * 10/1995 Baechler et al. ............. 280/650
5,476,275 A * 12/1995 Baechler et al. .......... 280/47.38
6,170,615 B1 * 1/2001 Cheng .......................... 188/20

* cited by examiner

Primary Examiner—Pam Rodriguez
(74) Attorney, Agent, or Firm—W. Wayne Liauh

(57) ABSTRACT

The present invention relates to a braking device for a stroller which provides the braking function on both rear wheels synchronously. The present invention utilizes a pedal which can swing left and right to carry a rotary cam mechanism. Then the pedal will convert the swinging motion to a linear back and forth motion on the left and right braking rods. To step on the pedal is to control the motion of left and right braking rods. The left and right braking rods will be carried by the pedal to brake or release these two wheels. The pedal further has a holding mechanism for keeping the pedal in a braked or released position.

22 Claims, 8 Drawing Sheets

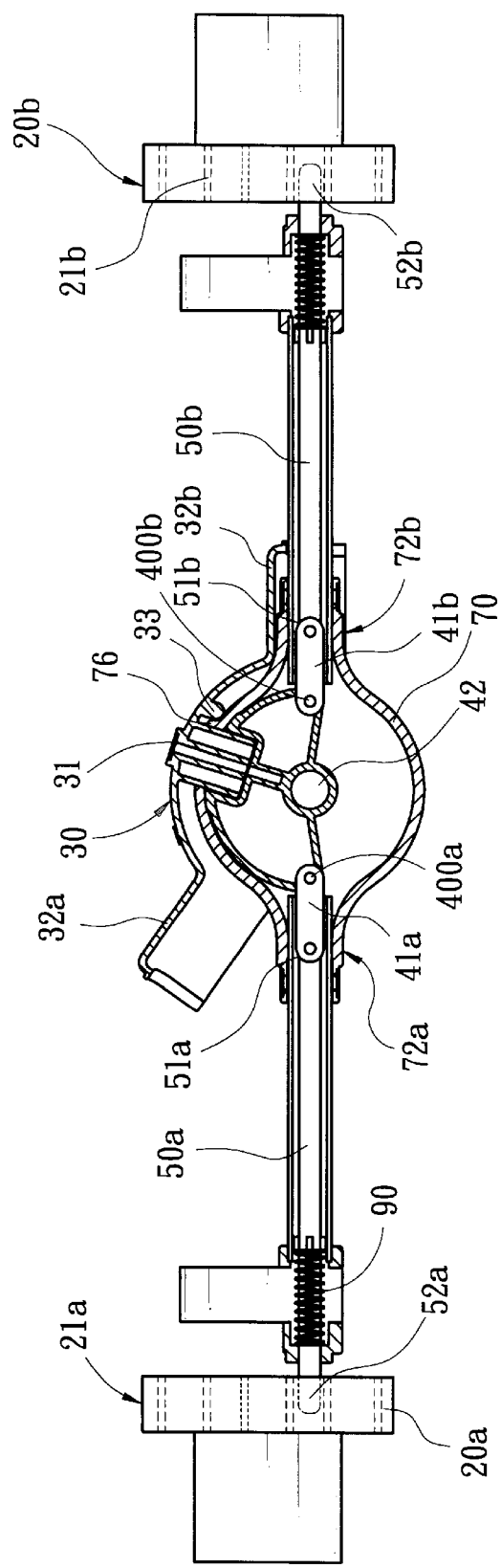
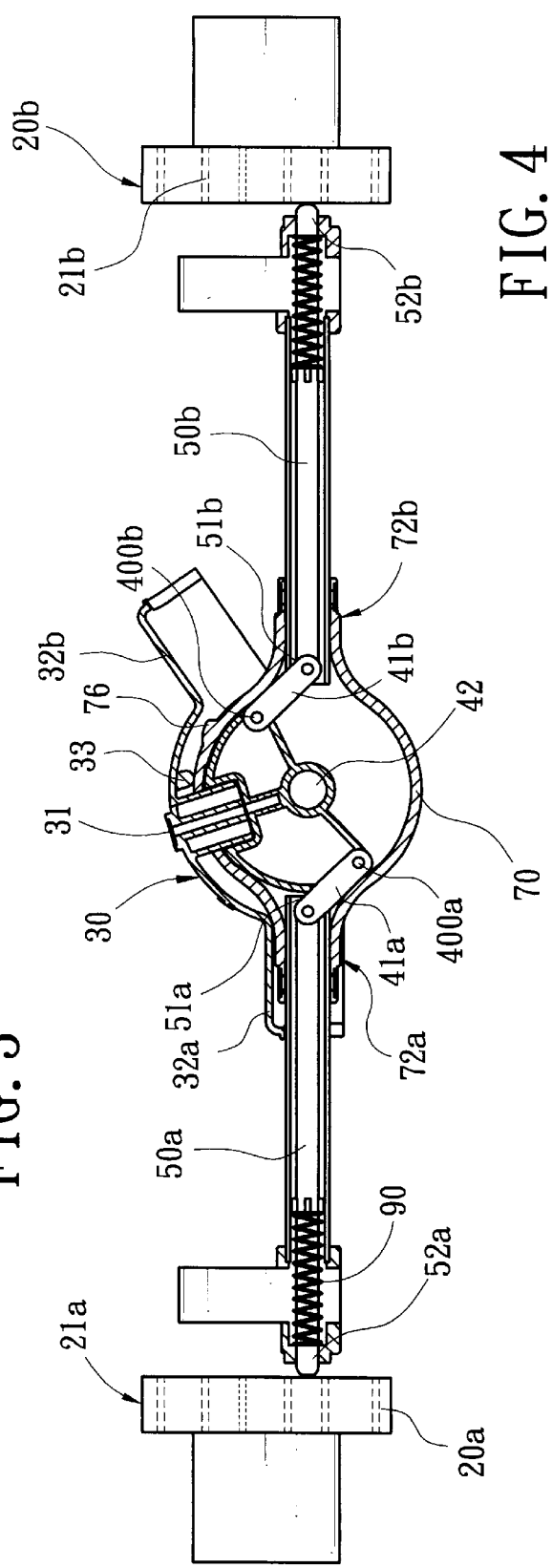
FIG. 3
FIG. 4

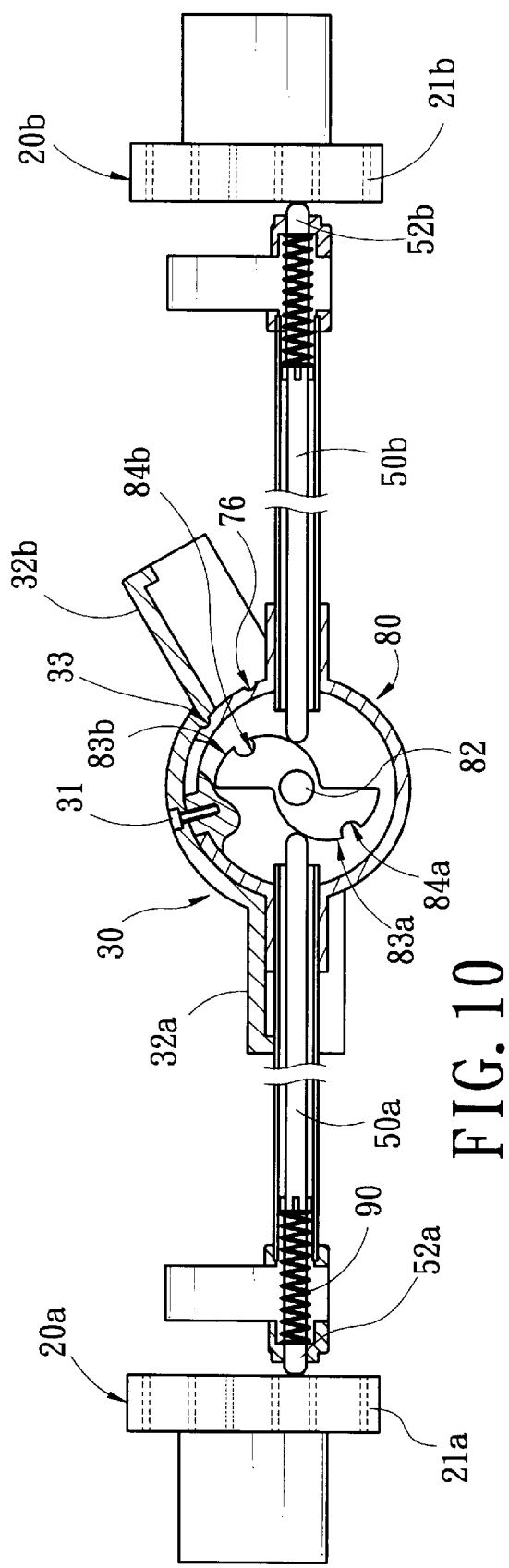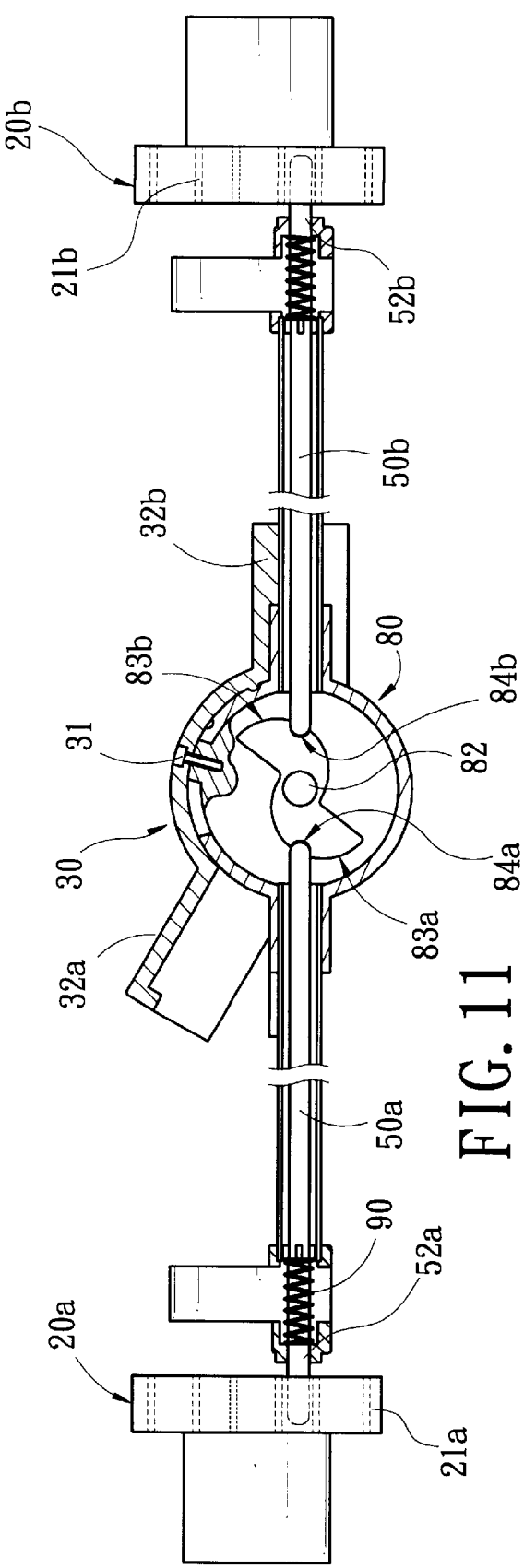

BRAKING DEVICE FOR A STROLLER

BACKGROUND OF INVENTION

1. Field of the Invention

The present invention relates generally to a braking device, more particularly to a braking device for use in a baby stroller.

2. Related Art

The braking device of a stroller is well known for the persons in the art, and this device is necessary equipment for a wheeled infant stroller. Generally, a stroller is equipped with more than three wheels including at least a pair of rear wheels. For safer and more reliable braking results, the braking device is needed to restrict the rotating of, the two rear wheels, which are rotating individually. It will be a better design to synchronously brake these two rear wheels simultaneously.

To meet the demands of the foregoing description, there are some disclosed braking devices for a stroller. Such as patent of Germany, DE29818659U1, which discloses a braking device having the ability to brake and release two rear wheels simultaneously. This braking device introduces a pedal or a protruding member which is capable of reciprocating motion along a straight line to interact with a braking tube that moves along the axis of a wheel axle and is capable of holding the petal-like fins of the wheel axle. The function of the braking of the wheels is performed by stepping on the protruding member while the function of releasing the wheels is performed by raising up the protruding member using the toes.

Another patent, U.S. Pat. No. 5,460,399, discloses a different kind of braking device. In this case, it introduces a pedal which can wiggle up and down and connects two braking rods. In the bottom of the pedal, there is a pair of inclined planes keeping a fixed included angle therewith. While operating braking activities, the pedal is stepped on, and the inclined planes are, then, pushed into a spoke. To release the braking status, we still use our toe to raise the pedal.

The foregoing examples illustrate the general operating principle to brake the stroller with toes by stepping on a pedal and to release it also with toes by lifting the pedal. Although the operating method in either step is simple, the operator needs to use the tip of his or her shoe. This can cause damages to the shoe.

SUMMARY OF THE INVENTION

Accordingly, the present invention provides mainly a braking device for the stroller with an easy operating method to solve the forgoing problems. The present invention discloses a braking device which does a double braking in one step, that is, braking two rear wheels simultaneously.

In order to meet the object, the present invention includes the following equipment:

- a pair of braking wheels, which have a plurality of radially extending support ribs and forms a plurality of openings between the ribs, fixed on both left and right wheels of the stroller and rotating synchronously with them;
- a pedal, which wiggles left and right to operate the braking and releasing motion of the stroller;
- a rotary cam member, which includes a rolling dish pivotally connected to the stroller and provided for being mounted by the pedal and a cam ditch on the rolling dish for converting a rotary motion thereof to a linear back and forth motion;
- a pair of braking rods, which include a left braking rod and a right braking rod; the left braking rod and the right braking rod are connected to the rolling dish at one end thereof, carried by the rolling dish to move along a linear direction parallel to the wheel axis back and forth, and do a braking and releasing operation by stretching into and drawing out from the openings between ribs of the braking wheels at the other free ends.

In the first embodiment of the present invention, the rolling dish connects one end of the left braking rod and the right braking rod through a pair of linking bars provided for carrying these two braking rods to move along the direction parallel to the wheel axis back and forth.

While in the second embodiment of the present invention, a pair of cam ditches are symmetrically located on the rolling dishes and provided for connection to one end of the left braking rod and the right braking rod. The left braking rod and the right braking rod are carried by the rolling dish to move along a linear direction parallel to the wheel axis back and forth and do a braking and releasing operation by stretching into and drawing out from the openings between ribs of the braking wheels at the other free ends.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention illustrated by the following drawings in which:

FIG. 3 is a cutting view of the braking device of the first embodiment of the present invention, depicting the operating status of being braked.

FIG. 4 is a cutting view of the braking device of the first embodiment of the present invention, depicting the operating status of being released.

FIG. 10 is a cutting view of the braking device of FIG. 9, depicting the operating status of being release FIG. 11 is a cutting view of the braking device of FIG. 9, depicting the operating status of being braked.

DETAILED DESCRIPTION OF THE PREFERRED EMBODIMENT

Embodiments of the present invention provide a braking device for a stroller.

Figure 1:
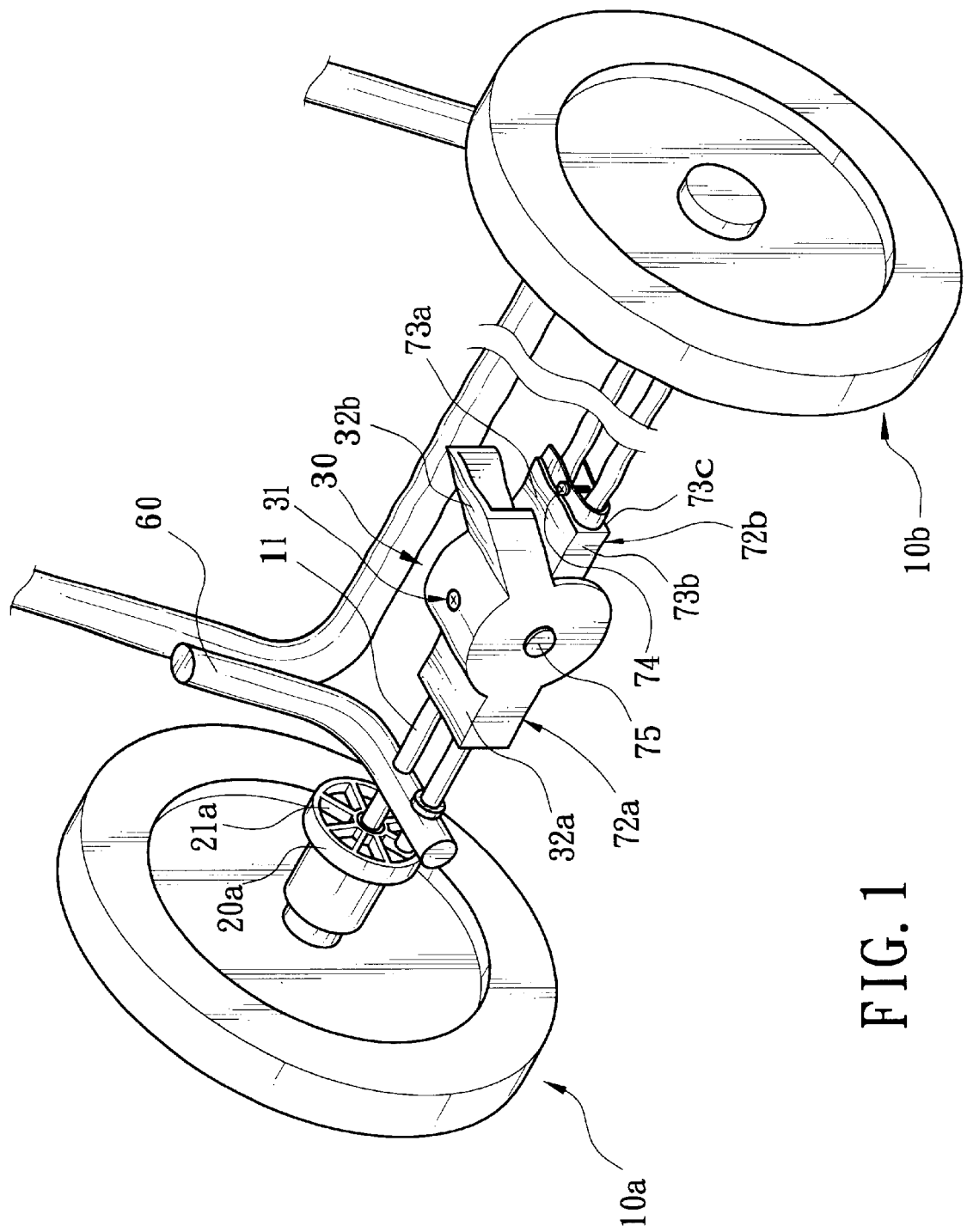
FIG. 1 is a isometric view of a baby stroller embodying the present invention, depicting the connection of the braking device with a stroller.
Figure 2:
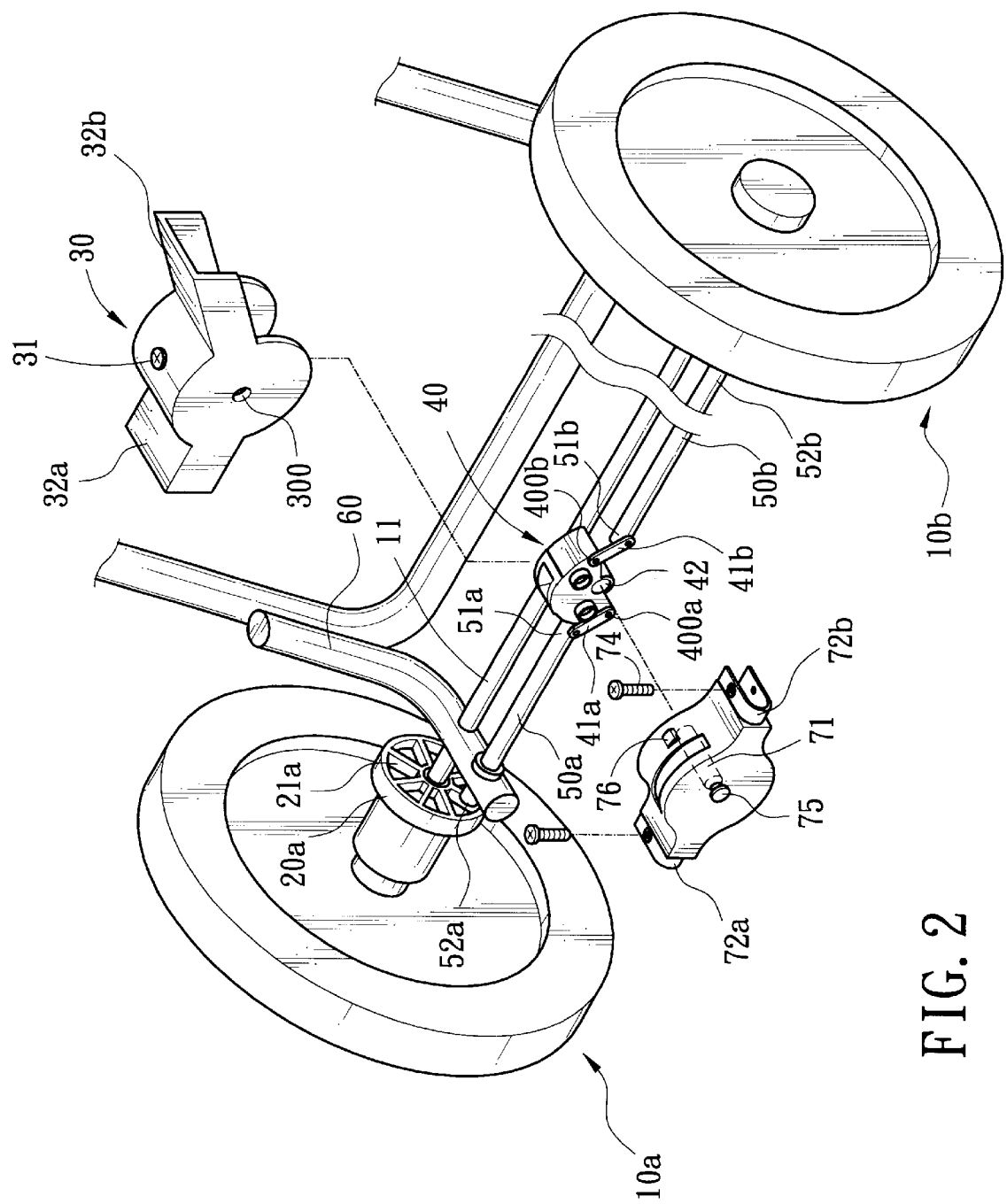
FIG. 2 is an enlarged, fragmentary view of the first embodiment of the present invention, depicting the constructing components of the braking device.

Firstly, referring to FIG. 1 and 2, the braking device of the embodiment of the present invention is preferred to be equipped on a pair of rear wheels, including a left wheel 10*a* and a right wheel 10*b*, to synchronously brake or release the left wheel 10*a* and the right wheel 10*b*. In general, the left wheel 10*a* and the right wheel 10*b* roll freely with respect to the wheel axle 11 where they are being fixed. The embodiment of the braking device of the present invention comprises:

a pair of braking wheels, including a left braking wheel 20*a* and a right braking wheel 20*b*, referring to FIG. 3, which have a plurality of radially extending support ribs 21*a* and forms a plurality of openings between ribs, fixed on both left braking wheel 20*a* and a right braking wheel 20*b* of the stroller and rotate synchronously with them;

a pedal 30, which wiggles left and right by carrying a rotary cam member to operate the braking and releasing motion of the stroller; and a pair of braking rods, which include a left braking rod 50*a* and a right braking rod 50b; the left braking rod 50*a* and a right braking rod 50*b* are connected to the rotary cam member to move along a linear direction parallel to the wheel axis 11 back and forth and do a braking and releasing operation by stretching into and drawing out from the openings between ribs of the braking wheels at the other free ends.

Referring to FIG. 2, in the first embodiment of the braking device of the present invention, the wheel axle 11 is firmly fixed to a main frame 60 of the stroller, wherein the rotary cam member includes a rolling dish 40 pivotally connected to the stroller and provided for being mounted by the pedal 30 and a pair of linking bars 41*a* and 41*b*. The rolling dish 40 is a sector-shaped element, having a hole 42 provided for mounting on an axle 71 and wiggling by pivoting on the axle 71. One end of the linking bars 41*a* and 41*b* is pivotally connected to ends 400*a* and 400*b* far from the center of the rolling dish 40 in an axial direction separately. The other end of the linking bars 41*a* and 41*b* is pivotally connected to the ends of the left braking rod 50*a* and the right braking rod 50*b*. Referring to FIG. 3, in braking status, the rolling dish 40 is at an approximately horizontal position, so are the ends 400*a* and 400*b*, which are also parallel to the wheel axle 11 and reach the farthest location away from the axle 71. At this moment, the linking bars 41 a and 41*b* push free ends 52*a* and 52*b* of the left braking rod 50*a* and the right braking rod 50*b* into the openings between ribs 21*a* of left braking wheel 20*a* and right braking wheel 20*b*. This completes the braking processes of left wheel 10*a* and right wheel 10*b* simultaneously. On the other hand, when the rolling dish 40 rotates at an angle, as shown in FIG. 4, the ends 400*a* and 400*b* are parallel to the wheel axle 11, or parallel to the left braking rod 50*a* and the right braking rod 50*b*, and reach the nearest location from the axle 71. At this moment, the linking bars 41*a* and 41*b* pull free ends 52*a* and 52*b* of the left braking rod 50*a* and the right braking rod 50*b* from the openings between ribs 21*a* of left braking wheel 20*a* and right braking wheel 20*b*. This completes the releasing processes of left wheel 10*a* and right wheel 10*b* simultaneously. For the sake of convenience of operation, compressible springs 90 are mounted at both ends of the left braking rod 50*a* and the right braking rod 50*b* in order to store the energy while the spring 90 is compressed during the braking process and the energy is restored to the spring 90 during the releasing process so as to push the left braking rod 50*a* and the right braking rod 50*b* to the normal, released, position.

The rolling dish 40 of the rotary cam member utilizes stationary housing 70 provided to pivotally mount on the wheel axle 11. A pedal 30 is connected to the rolling dish 40. When either the left side or the right side of the pedal is stepped on, the rolling dish 40 is carried to swing left and right, as shown in FIGS. 3 and 4.

Stationary housing 70 is a hollow element, comprising an axle 71 and a gripping portion provided for clamping the wheel axle 11. The gripping portion comprises a left gripping arm 72*a* and right gripping arm 72*b* extending along the wheel axle 11 and symmetric with respect to the axle 71 in a radial direction. The axle 71 goes through the hole 42 of the rolling dish 40 and is fixed to wheel axle 11. This rolling dish 40 swings on the axle 71 left and right The left gripping arm 72*a* and the right gripping arm 72*b* further comprise three plates 73*a*, 73*b* and 73*c* which are connected mutually, continues and forms an open circular ring, like the letter 'U', in its cutting plane. The plates 73*a* and 73*c* are then tightly fixed to the wheel axle 11 by a screw bolt 74.

The pedal 30 and the rolling dish 40 have the same rotating center. In the first embodiment, the pedal 30 is fixed on a bottom 75 of the stationary housing 70 through the hole 300 thereon, and utilizes a connecting element 31, for example, a screw bolt, to connect to the outer rim of the rolling dish 40. Whichever the left portion 32*a* or right portion 32*b* of the pedal 30 is pushed or stepped on, it will carry the rolling dish to swing synchronously.

Figure 5:
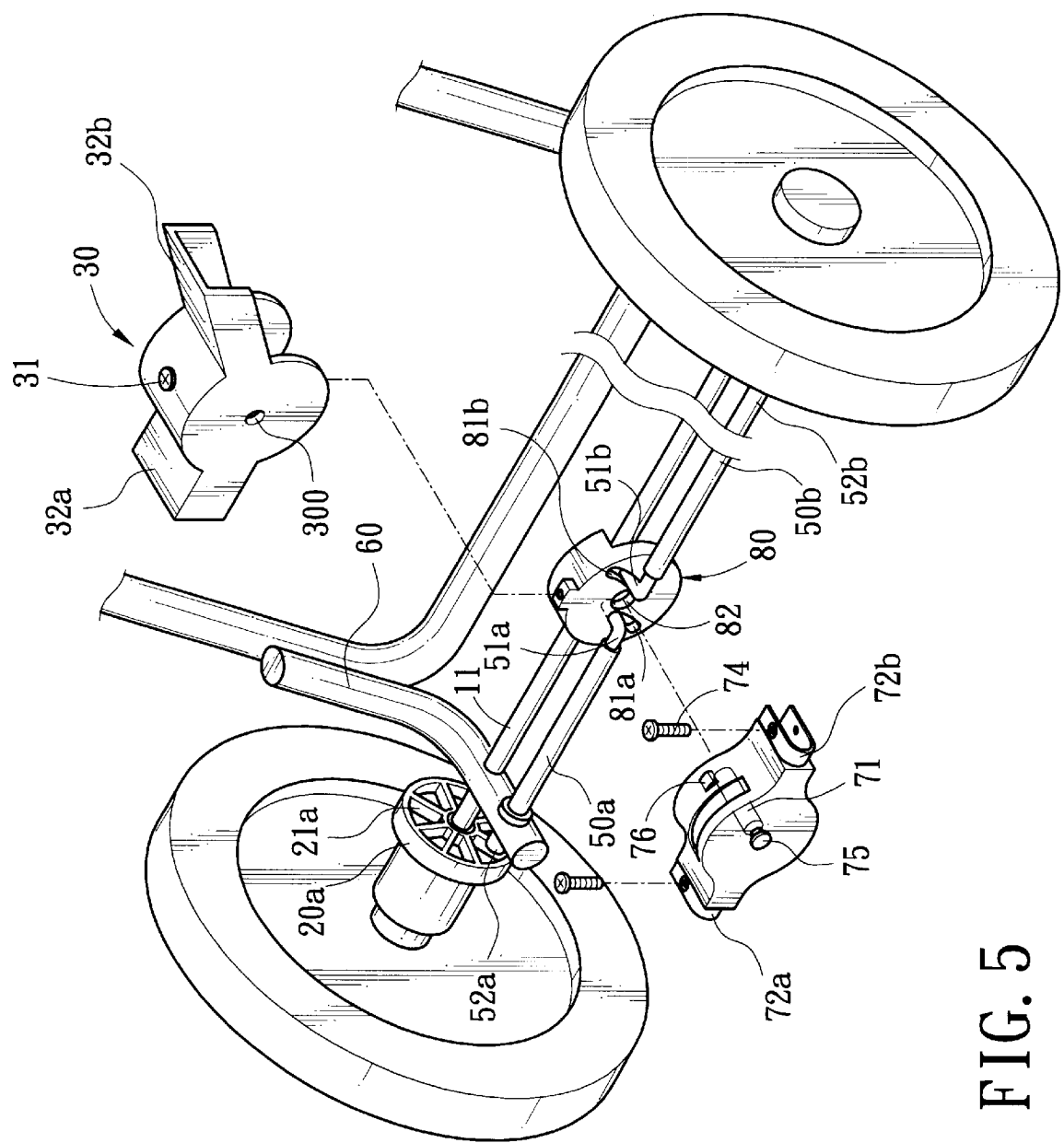
FIG. 5 is an enlarged, fragmentary view of the second embodiment of the present invention, depicting the construction components of the braking device.
Figure 6:
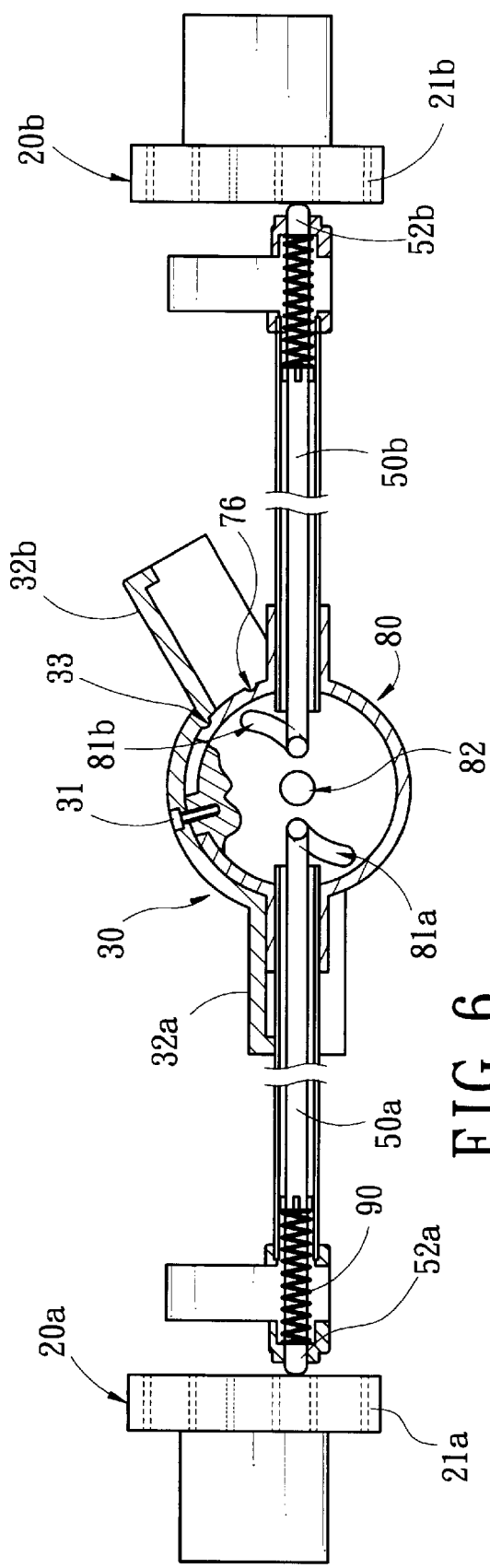
FIG. 6 is a cutting view of the braking device of the second embodiment of the present invention, depicting the operating status of being released.
Figure 7:
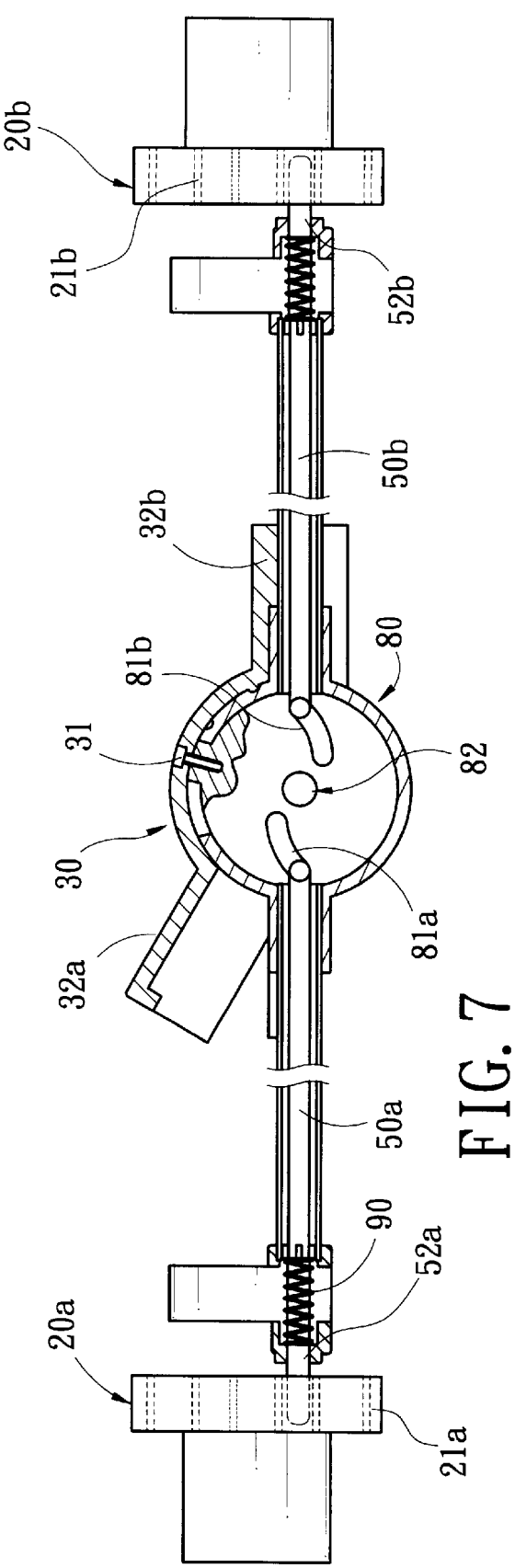
FIG. 7 is a cutting view of the braking device of the second embodiment of the present invention, depicting the operating status of being braked.

Referring to FIG. 5, in the second embodiment of the present invention, the rotary cam member comprises a rolling dish 80, which is different from that disclosed in the first embodiment, and two cam ditches 81*a* and 81*b* located on the rolling dish 80 thereof. The pedal 30 is also connected to the rolling dish 80 in a similar way as pre-described. Swinging the pedal 30 will also carry the rolling dish 80 to rotate, and the cam ditches 81*a* and 81*b* will convert the rotation motion to a linear back and forth motion. In the center of the rolling dish 80, there is a hole 82. The cam ditches 81*a* and 81*b* are located in a symmetric place with respect to the hole 82 in a radial direction and extend gradually outward. The ends 51*a* and 51*b* of each one of the braking rods 50*a* and 50*b* perpendicularly insert into the cam ditches 81*a* and 81*b*. As a result, when the rolling dish 80 swings left and right, it carries the braking rods 50*a* and 50*b* simultaneously in a linear back and forth motion and pushes the other ends 52*a* and 52*b* of each one of the braking rods 50*a* and 50*b* into the openings between ribs 21*a* of the braking wheels 20*a* and 20*b*, as shown in FIG. 7. Or it draws the other ends 52*a* and 52*b* of one of each of the braking rods 50*a* and 50*b* out from the openings between ribs 21*a* of the braking wheels 20*a* and 20*b*, as shown in FIG. 6.

Figure 9:
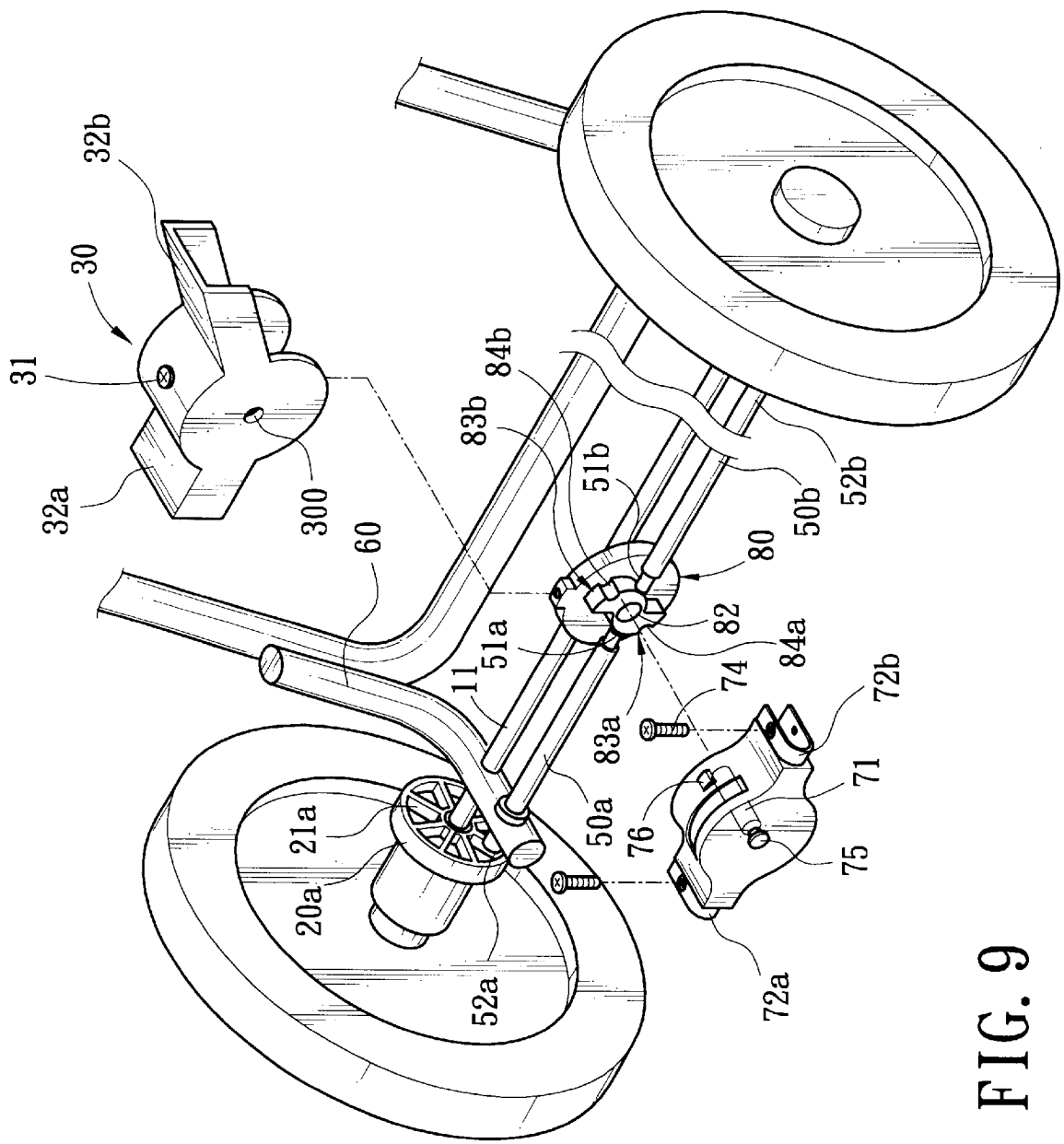
FIG. 9 is an isometric view of a baby stroller embodying the present invention, depicting another embodiment of the rotary cam member.

Similarly, the cam ditches 81*a* and 81*b* shown in the embodiment of FIG. 5 can be changed to cam surfaces 83*a* and 83*b* shown in the embodiment of FIG. 9.

These two cam surfaces 83*a* and 83*b* are also symmetric and extend gradually outward. In case of a normal un-braked situation, the cam surfaces 83*a* and 83*b* are pushed by spring and kept in touch with the ends 51*a* and 51*b* of the left and right braking rods 50a and 50b, as shown in FIG. 10. On the other hand, in case of a braked situation, the ends 51a and 51b of the left and right braking rods 50a and 50b are pushed by the cam surfaces 83a and 83b, and the other free ends 52a and 52b of the left and right braking rods 50a and 50b are, then, pushed into the openings between ribs 21a of the braking wheels 20a and 20b in order to brake synchronously, as shown in FIG. 11. In the meanwhile, the ends 51a and 51b of the left and right braking rods 50a and 50b will sink into concaving portions 84a and 84b of the cam surfaces 83a and 83b in order to keep the left and right braking rods 50a and 50b in their locations from sliding off until the left portion 32a of the pedal 30 is stepped on. After being stepped on, the left portion 32a of the pedal 30 returns to its normal locations, as shown in FIG. 10.

To hold the braked status, the present invention further discloses a holding mechanism as shown in FIG. 3, 4 or FIG. 6, 7. A holding point 76 is located on the surface of the outer circumference of stationary housing 70. And a stop point 33 is located on the inner facing surface of the pedal 30. When the pedal 30 is stepped on to the braked position, as shown in FIG. 3 and 7, it will be kept in that position by matching the holding point 76 and the stop point 33 together in order to prevent the braked status from being released. However, the matching force between the holding point 76 and the stop point 33 is limited. This can be easily released by users who step on the pedal 30.

In the first embodiment shown in FIG. 3 and 4, the holding point 76 and the stop point 33 are both bulges. In the second embodiment shown in FIG. 6 and 7, the holding point 76 is a denting cave and the stop point 33 is a bulge.

Figure 8:
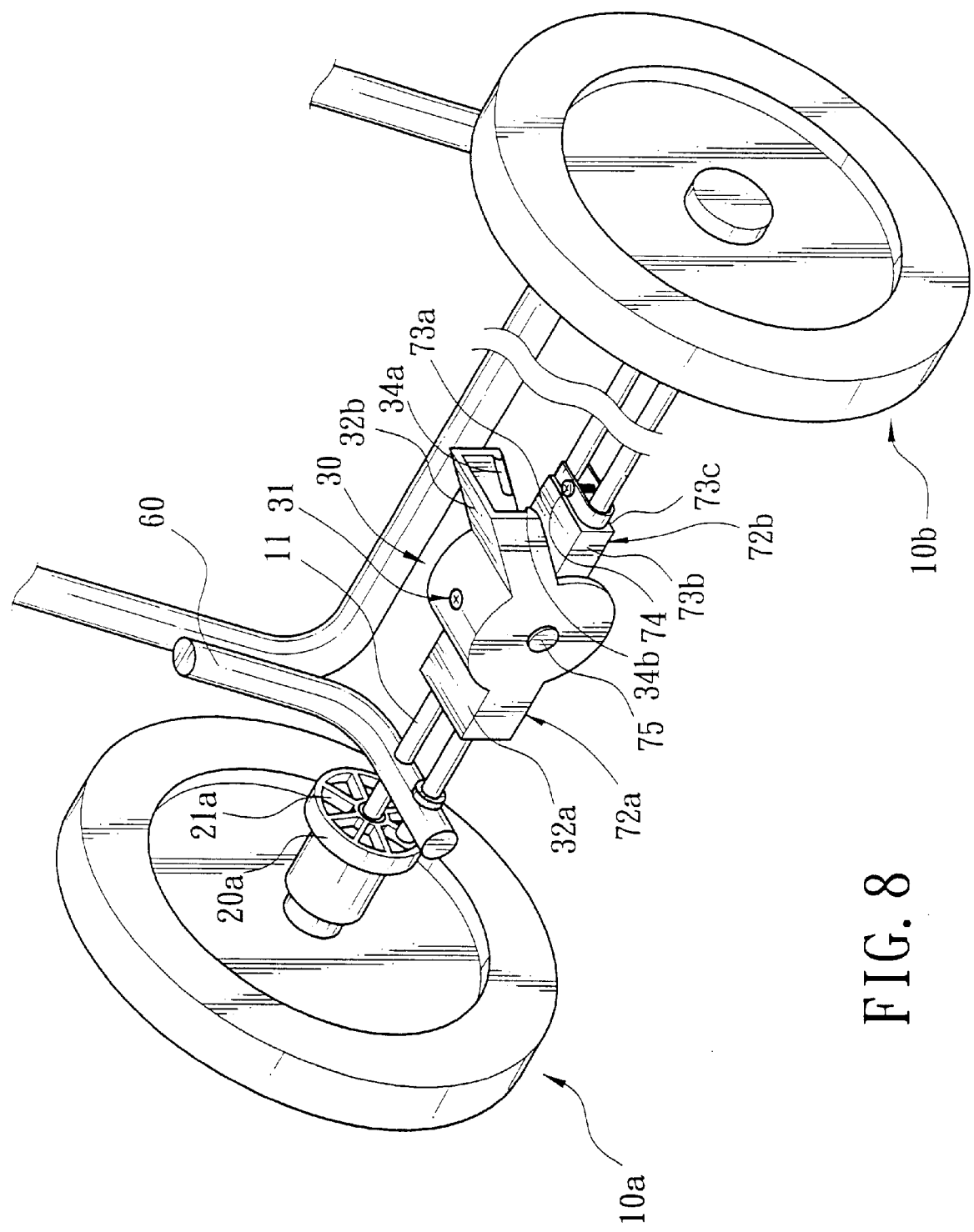
FIG. 8 is an isometric view of a baby stroller embodying the present invention, depicting another embodiment of the holding mechanism.

Referring to FIG. 8, the bulges 34a and 34b located on the right portion 32b of the pedal 30 can also be the holding mechanism, and form a gripper provided for gripping the right braking rod 50b and wheel axle 11 in order to keep the pedal 30 in the braking position and prevent it from being released.

As to the manner of usage and operation of the present invention, the same should be apparent in the above description. Accordingly, no further discussion related to the manner of usage and operation will be provided.

With respect to the above description then, it should be realized that the optimum dimensional relationships for the parts of the invention, including variations in size, materials, shape, form, function and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily be made by those skilled in the art, it is not described to limit the invention to the exact construction and operation shown. Accordingly, all suitable modifications and equivalents may be restored to fall within the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stroller braking device, which is equipped on a pair of rear wheels thereof provided for synchronously braking said pair of said rear wheels pivotally connected on the same wheel axle, comprising:

a pair of braking wheels, which have a plurality of radially extending support ribs, forming a plurality of openings therebetween, said pair of braking wheels being fixed on said rear wheels of said stroller;

a pair of braking rods, which can move along a linear direction parallel to the wheel axle back and forth in order to insert into and draw out from said openings between said ribs freely;

a rotary cam member, which includes a rolling dish pivotally connected to the stroller and provided for connecting with said braking rods for converting a rotary motion thereof to a linear back and forth motion; and a pedal, which includes a left portion and a right portion and is pivotally connected on said rotary cam member, wiggling left and right to operate the braking and releasing motion of the stroller;

wherein said rotary cam member further comprises a stationary housing which is firmly connected on the wheel axle and has a rolling axle for pivotally connecting with said rolling dish;

further wherein said stationary housing is a hollow element having a gripping portion provided for clamping the wheel axle and further comprising a left gripping arm and right gripping arm extending along the wheel axle and symmetric with respect to the axle in the radial direction.

2. A stroller braking device as described in claim 1, wherein said left gripping arm and said right gripping arm further comprise three plates which are connected mutually, and continue and form an open circular ring in a cutting plane thereof, and are tightly fixed to the wheel axle by a screw bolt.

3. A stroller braking device as described in claim 1, wherein said rolling dish has cam ditches which are located in a symmetric place in the radial direction with respect to the center of said rolling dish.

4. A stroller braking device as described in claim 1, wherein each of said braking rods has a spring located at one end thereof and provided for pushing each said braking rod back to a un-braked position.

5. A stroller braking device as described in claim 1, wherein said rolling dish has cam surfaces which are located in a symmetric place in the radial direction with respect to the center of said rolling dish, extend gradually outward thereon, and are provided for pushing each said braking rod in a linear back and forth motion.

6. A stroller braking device as described in claim 5, wherein said cam surfaces have concaving portions which are provided for each braking rod to sink into, to hold each rod in a braked position, and to prevent each braking rod from taking off.

7. A stroller braking device as described in claim 5, wherein said braking device further comprises a holding mechanism, which includes a holding point located on the surface of the outer circumference of said stationary housing and a stop point located on the inner facing surface of said pedal, when said pedal is stepped on to said braked position, said holding mechanism being kept in a fixed position by matching said holding point and said stop point together in order to prevent the braked status from being released.

8. A stroller braking device as described in claim 7, wherein said holding point and said stop point are bulges.

9. A stroller braking device as described in claim 7, wherein said holding point is a denting cave and said stop point is a bulge.

10. A stroller braking device which is equipped on a pair of rear wheels thereof provided for synchronously braking said pair of said rear wheels pivotally connected on the same wheel axle, comprising:

a pair of braking wheels, which have a plurality of radially extending support ribs, forming a plurality of openings therebetween, said pair of braking wheels being fixed on said rear wheels of said stroller;

a pair of braking rods, which can move along a linear direction parallel to the wheel axle back and forth in order to insert into and draw out from said openings between said ribs freely;

a rotary cam member, which includes a rolling dish pivotally connected to the stroller and provided for connecting with said braking rods for converting a rotary motion thereof to a linear back and forth motion; and a pedal, which includes a left portion and a right portion and is pivotally connected on said rotary cam member, wiggling left and right to operate the braking and releasing motion of the stroller;

wherein said rotary cam member further comprises a stationary housing which is firmly connected on the wheel axle and has a rolling axle for pivotally connecting with said rolling dish;

further wherein said rolling dish is pivotally connected to one end of each of said braking rods by a pair of linking bars.

11. A stroller braking device as described in claim 10, wherein said rolling dish is a sector-shaped element, having a hole provided for mounting on said rolling axle and wiggling by pivoting on said rolling axle, wherein one end of each of said linking bars is pivotally connected to the end far from the center of said rolling dish in an axial direction separately.

12. A stroller braking device as described in claim 10, wherein said rolling dish has cam ditches which are located in a symmetric place in the radial direction with respect to the center of said rolling dish.

13. A stroller braking device as described in claim 10, wherein each of said braking rods has a spring located at one end thereof and provided for pushing each said braking rod back to a un-braked position.

14. A stroller braking device as described in claim 10, wherein said rolling dish has cam surfaces which are located in a symmetric place in the radial direction with respect to the center of said rolling dish, extend gradually outward thereon, and are provided for pushing each said braking rod in a linear back and forth motion.

15. A stroller braking device as described in claim 14, wherein said cam surfaces have concaving portions which are provided for each said braking rod to sink into, to hold each said rod in a braked position, and to prevent each said braking rod from taking off.

16. A stroller braking device as described in claim 14, wherein said braking device further comprises a holding mechanism, which includes a holding point located on the surface of the outer circumference of said stationary housing and a stop point located on the inner facing surface of said pedal, when said pedal is stepped on to said braked position, said holding mechanism being kept in a fixed position by matching said holding point and said stop point together in order to prevent the braked status from being released.

17. A stroller braking device, which is equipped on a pair of rear wheels thereof provided for synchronously braking said pair of said rear wheels pivotally connected on the same wheel axle, comprising:

a pair of braking wheels, which have a plurality of radially extending support ribs, forming a plurality of openings therebetween, said pair of braking wheels being fixed on said rear wheels of said stroller;

a pair of braking rods, which can move along a linear direction parallel to the wheel axle back and forth in order to insert into and draw out from said openings between said ribs freely;

a rotary cam member, which includes a rolling dish pivotally connected to the stroller and provided for connecting with said braking rods for converting a rotary motion thereof to a linear back and forth motion; and a pedal, which includes a left portion and a right portion and is pivotally connected on said rotary cam member, wiggling left and right to operate the braking and releasing motion of the stroller;

wherein the right portion of said pedal has a pair of bulges and constructs a gripper provided for gripping a right braking rod and said wheel axle so as to keep said pedal in the braked position and prevent said pedal from being released.

18. A stroller braking device as described in claim 17, wherein said rolling dish has cam ditches which are located in a symmetric place in the radial direction with respect to the center of said rolling dish.

19. A stroller braking device as described in claim 17, wherein each of said braking rods has a spring located at one end thereof and provided for pushing each said braking rod back to a un-braked position.

20. A stroller braking device as described in claim 17, wherein said rolling dish has cam surfaces which are located in a symmetric place in the radial direction with respect to the center of said rolling dish, extend gradually outward thereon, and are provided for pushing each said braking rod in a linear back and forth motion.

21. A stroller braking device as described in claim 20, wherein said cam surfaces have concaving portions which are provided for each said braking rod to sink into, to hold each said rod in a braked position, and to prevent each said braking rod from taking off.

22. A stroller braking device as described in claim 20, wherein said braking device further comprises a holding mechanism, which includes a holding point located on the surface of the outer circumference of said stationary housing and a stop point located on the inner facing surface of said pedal, when said pedal is stepped on to said braked position, said holding mechanism being kept in a fixed position by matching said holding point and said stop point together in order to prevent the braked status from being released.

* * * * *